US005547214A

United States Patent [19]
Zimmerman, II et al.

[11] Patent Number: 5,547,214
[45] Date of Patent: Aug. 20, 1996

[54] SIDE IMPACT SOFT PACK AIR BAG MODULE

[75] Inventors: Ronald A. Zimmerman, II, Rochester; John C. Hofer, Novi, both of Mich.

[73] Assignee: AlliedSignal Inc., Morristown, N.J.

[21] Appl. No.: 376,419

[22] Filed: Jan. 23, 1995

[51] Int. Cl.⁶ .................................................. B60R 21/22
[52] U.S. Cl. ...................................... 280/730.1; 280/730.2
[58] Field of Search ................................ 280/730.1, 730.2

[56] References Cited

U.S. PATENT DOCUMENTS

| | | | |
|---|---|---|---|
| 3,779,577 | 12/1973 | Wilfert | 280/730.1 |
| 4,946,191 | 8/1990 | Putsch | 280/730.1 |
| 5,112,079 | 5/1992 | Haland et al. | 280/730.1 |
| 5,348,342 | 9/1994 | Haland et al. | 280/730.1 |

FOREIGN PATENT DOCUMENTS 4-50052  2/1992  Japan ................................ 280/730.1

Primary Examiner—Kenneth R. Rice
Attorney, Agent, or Firm—Markell Seitzman

[57] ABSTRACT

A side impact occupant system including the combination of: a vehicle seat (16) having a cushioned resilient portion (18) in a seat back (14) thereof, an air bag module (10) comprising a compliant air bag retained to a channel by a soft, resilient exterior package shell (70) directly adjacent to and facing an interior part of the resilient cushioned portion of the seat, wherein the resiliency of the cushioned seat portion is not markedly changed by the adjacent resilient shell.

14 Claims, 4 Drawing Sheets

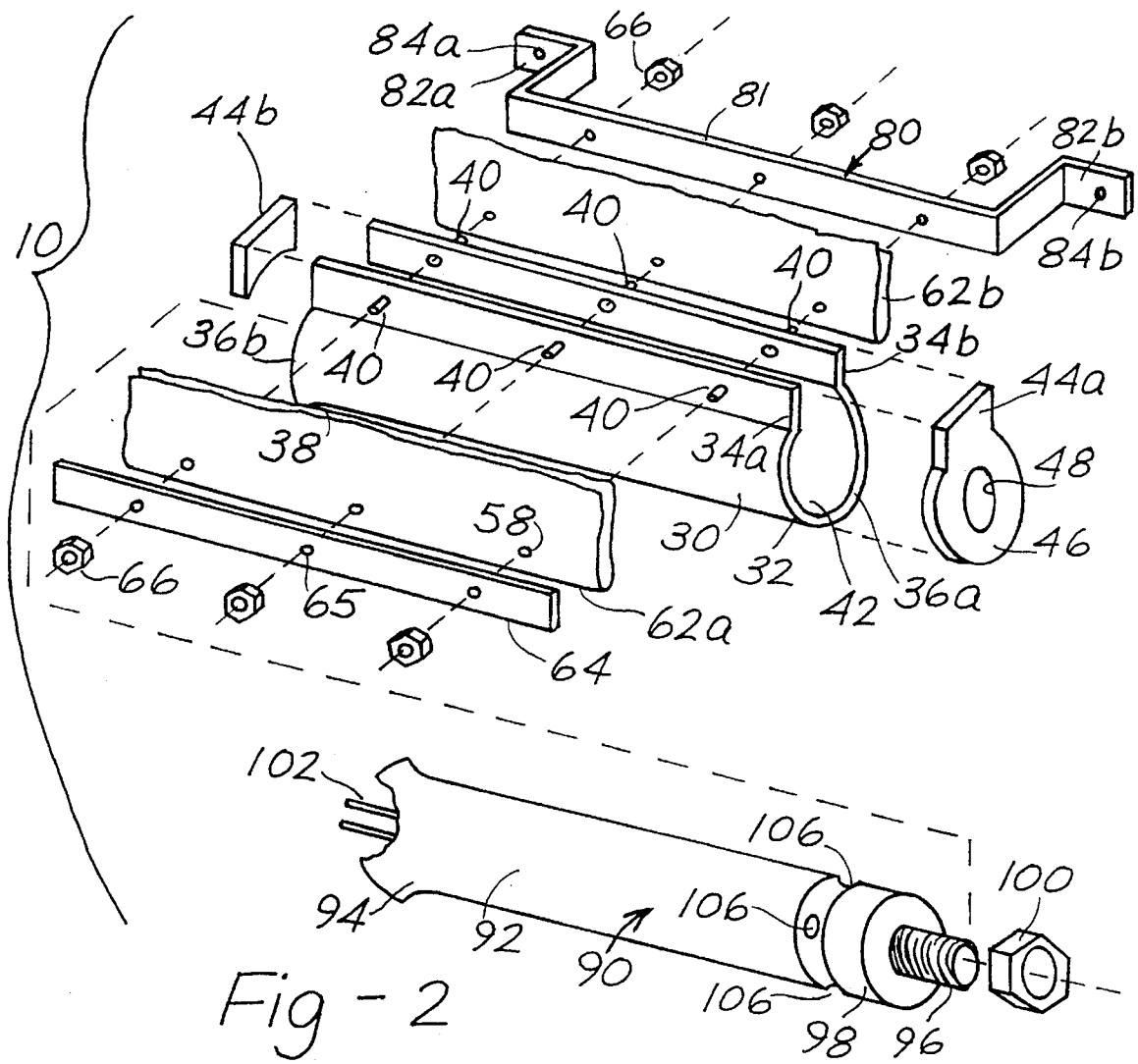
Fig-2
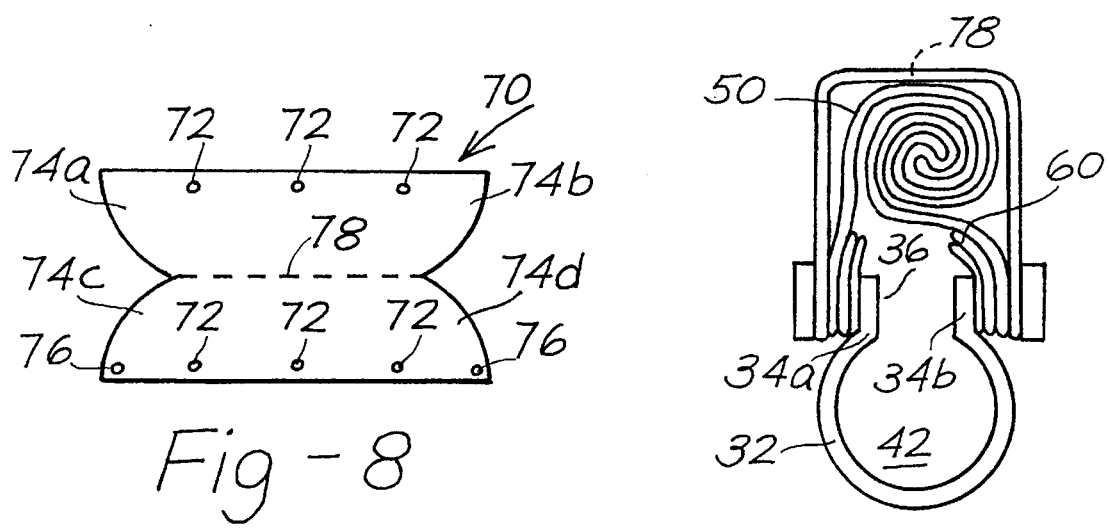
Fig-8
Fig-3

SIDE IMPACT SOFT PACK AIR BAG MODULE

BACKGROUND AND SUMMARY OF THE INVENTION

The present invention relates generally to air bag systems and more specifically to side impact occupant protection systems.

It has been proposed to protect vehicle occupants during a side impact collision to introduce an air bag between the occupant's torso and the interior of the vehicle. U.S. Pat. No. 3,617,073 is illustrative of a system in which the air bag protective system is located within a vehicle door. British Patent Specification 1 450 666 introduces the air bag from a top rail or roof while British Patent 2 232 936B shows an air bag formed within a seat.

With regard to seat mounted air bag systems it is desirable for the air bag and its associated mounting hardware to be constructed in a way that it is compatible with seat design and does not interfere with occupant comfort. All known air bag technologies mount the air bag in a rigid housing with a rigid cover about the air bag. This type of construction if placed behind the soft, compliant foam padding of the seat will reduce the resiliency of the padding lessening occupant comfort.

It is an object of the present invention to provide a side impact system that is compact in design and light-weight. A further object of the invention is to provide a side impact air bag module that is substantially smaller than the height of the back of the seat, thereby permitting the air bag module to be mounted at one of many desirable locations within the seat back without distracting from occupant comfort.

Accordingly, the invention comprises: a side impact occupant protection system including: an air bag module, having a soft exterior adapted to be placed adjacent a resilient interior portion of a seat back of an automotive seat. The system includes a channel having a key-hole shaped cross-section including a first cylindrical wall portion having a wide first diameter and a second portion having two spaced parallel sides forming an open top through which inflation gas may flow into an adjacent air bag. The distance across the space between the sides is less than that of the first diameter. The channel additionally includes a first end and a second end, the first end is substantially closed by a first end plate and includes a small opening therein. A cylindrically shape air bag inflator is fitted to and secured within the cylindrical portion of the channel. The inflator has at least one gas exit port directing inflation gas into the open top and thereafter into the air bag. The air bag is disposed, prior to activation of the inflator, in a compacted configuration over the top and about the sides of the channel such that opposing end sections of the air bag lie adjacent to a corresponding side. The system includes clamping means running along substantially the entire length of each channel side for clamping the end section of the air bag to the channel; wherein the clamping means, adjacent the air bag end sections, does not extend outwardly beyond the exterior of the cylindrical portion. The air bag is retained about the channel bag by a soft flexible outer shell.

Many other objects and purposes of the invention will be clear from the following detailed description of the drawings.

BRIEF DESCRIPTION OF THE DRAWINGS

In the drawings:

FIG. 2 illustrates an assembly view showing the major components of a first embodiment of the invention.

FIG. 3 illustrates a cross-sectional view of the module of FIG. 2

FIG. 8 shows a plan view of a covering material.

DETAILED DESCRIPTION OF THE DRAWINGS

Figure 1:
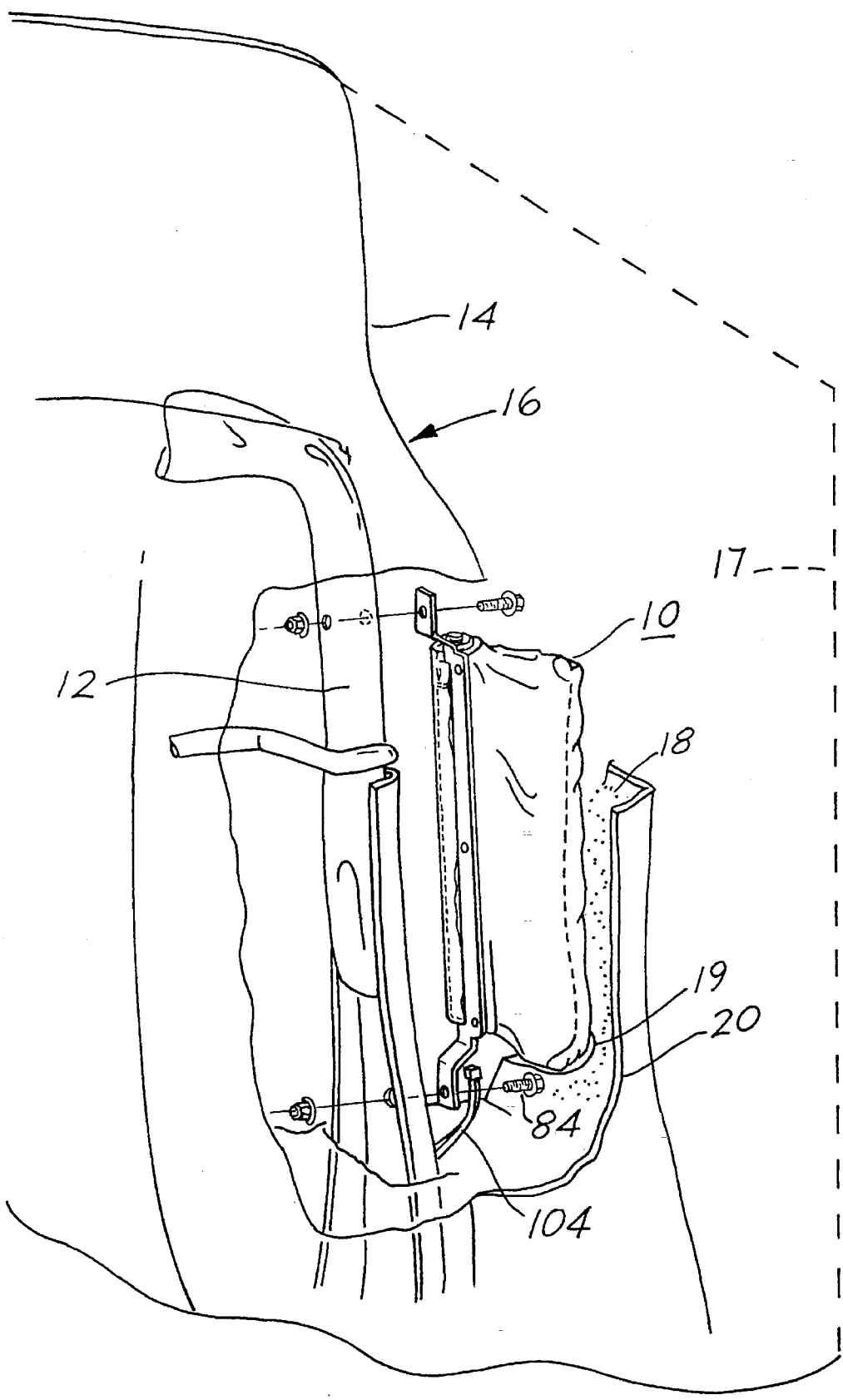
FIG. 1 illustrates a partial sectional view of an automotive seat showing the location of a side impact air bag module.
Figure 4:
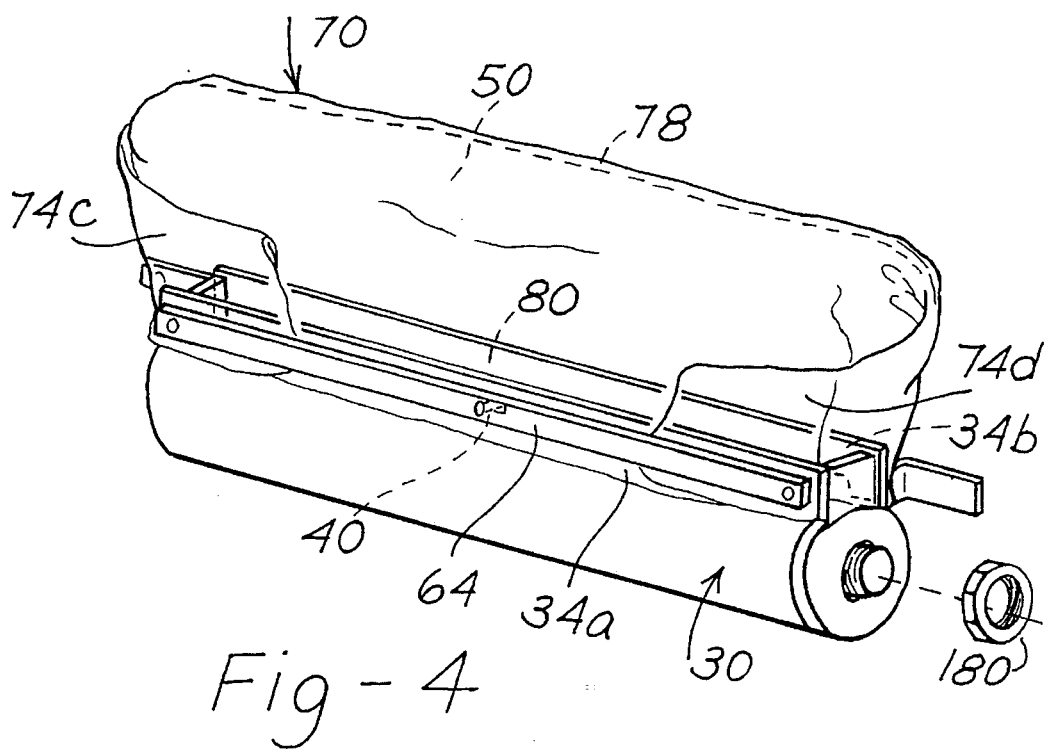
FIG. 4 illustrates an isolated isometric view of an assembled module.

Reference is made to FIGS. 1 through 4 which illustrate a first embodiment of the present invention. FIG. 1 shows a soft pack air bag module generally indicated by numeral 10 attached to a frame 12 located in the seat back 14 of a vehicle seat 16. The seat is adjacent a vehicle side 17.

As is known in the art, the frame 12 is covered by a foam material 18 that in turn is covered by a skin 20. The skin 20 is typically leather, vinyl or fabric. The foam 18, proximate the module 10, includes a hollowed-out portion 19 to receive the module 10.

Reference is now made to FIG. 2 which illustrates an assembly view of the module 10. The module comprises a formed or extruded, preferably metal, channel 30 having a generally circular lower section 32 and opposing walls 34a and 34b extending outwardly from the circular section 32. As can be seen in FIG. 2, as well as in the cross-section of FIG. 3, the channel has an open side or top 36 and its cross-section generally resembles a key or keyway. The channel 30 is open at its ends 36a and 36b. The end of the circular section 32 near channel end 36b may be flared outwardly generally at 38. Each of the walls 34a and 34b includes a plurality of threaded fasteners 40 extending outwardly therefrom. The key shaped spacing 42 formed by the channel 30 is partially enclosed by end caps 44a and 44b. The end caps are attached such as by welding to the ends of the side walls 34a and 34b. End cap 44a includes a ringed portion 46 having a central opening 48 for partially enclosing the end 34b of the channel 30.

Figure 7:
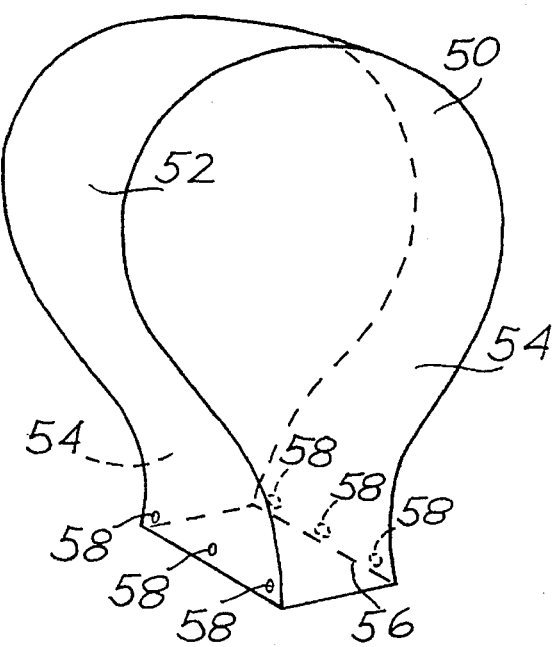
FIG. 7 diagrammatically shows an air bag.

The module 10 includes an air bag generally shown as 50. The air bag comprises a main panel 52 and two side panels 54, only one of which is shown in FIG. 7. The air bag 50 includes a narrowed neck region 56. The main panel 52, proximate the neck region, includes a plurality of openings 58. During assembly the neck portion 56 is slid over the side walls 34a and 34b with the various openings 58 aligned to the extending fasteners 40. Thereafter the fasteners are inserted through a corresponding one of the openings 58.

As can be seen from FIG. 3 the air bag 50 may include, proximate the ends of the main panel near the openings 58, one or more additional layers of fabric, generally shown as 60, to reinforce this area of the air bag. These additional layers of fabric 60 may also function as a heat shield to protect other parts of the air bag from the intense heat generated by a gas inflator 90 (or gas generator as it is also referred to in the art). With the air bag mounted to the channel 30, the air bag is generally rolled or folded into a compact configuration as generally shown in FIG. 3. To prevent the air bag from unrolling or unfolding, the module 10 further includes a flexible fabric covering or material that is used to entrap the folded air bag. This covering material or soft outer shell 70 is generally shown in FIG. 8. After the air bag is folded generally in accordance with FIG. 3, the holes 72 of the shell are fitted about the corresponding fasteners 40 such that the cover generally envelopes the folded air bag. As also can be seen from FIG. 8, the cover 70 includes four flaps 74a–74d. Flaps 74a and 74b are then moved inwardly so that they lie against ends of the folded or rolled air bag. Thereafter flap 74c having an additional hole 76 is wrapped about flap 74a and the opening 76 is secured to a corresponding fastener 40. Similarly, flap 74d is moved about flap 74b and hole 76 secured to a corresponding fastener 40. In this manner, the cover 70 virtually envelopes the entire folded air bag and provides a soft package exterior. The shell 70 also includes a preferred tear region that may be formed by a line of perforations 78 that permit it to easily open when the air bag is inflated. The cover or shell 70 and air bag 50 are secured to the channel 30 by a bar 64 having openings 65 therein. The bar 64 is secured to the fasteners on side 34a by a plurality of fasteners 66 such as threaded nuts. The other side of the air bag 50 and cover 70 are similarly secured to the channel by a bracket 80 that includes a bar portion 81 and offset end portions 82a and 82b each of which includes a mounting hole 84a and 84b. As can be seen in FIG. 1, a plurality of fasteners generally shown as 84 are used to mount the module 10 to the seat 16 via the mounting holes.

Returning briefly to FIG. 2, the module 10 further includes an inflator 90 having a generally circular cylindrical body and an optional flared end 94 for mating against the optional flared end 38 of the channel 30. The inflator includes a mounting stud 96 extending from end 98. During assembly the inflator 90 is slid in end 36b with the stud 96 extending from opening 48. Thereafter a fastener 100 secures the inflator to the channel. The inflator will typically include a plurality of electric terminals (or at least wires) 102 adapted to receive a control signal over wires generally shown as 104 (see FIG. 1). If the inflator 90 is of the solid propellant type it will normally include a plurality of uniformly spaced gas exit ports along the body 92. If the inflator 90 is of the hybrid inflator type, the exit ports such as 106 are generally concentrated at one end of the body such that they are remote from an adjacent pressure vessel portion used to store inert inflation gas. As both the construction of the solid and gaseous or other types of inflators are well understood, further discussion is not necessary.

Figure 5:
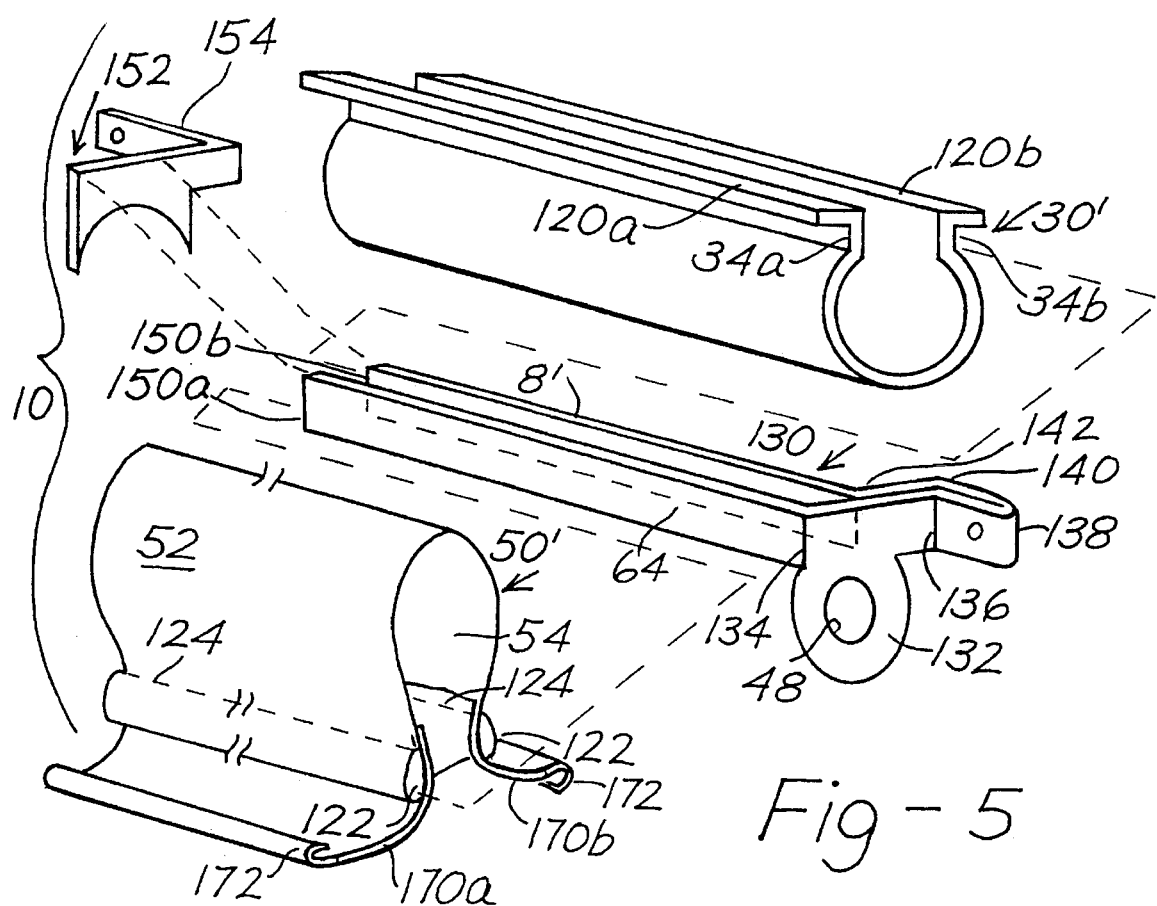
FIG. 5 shows an assembly view of another embodiment of the present invention.
Figure 6:
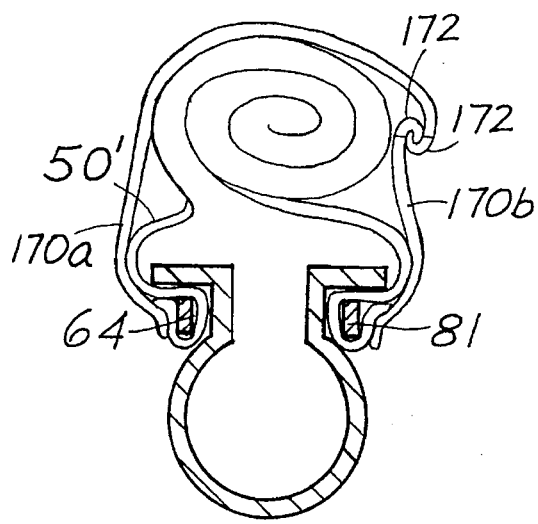
FIG. 6 illustrates a cross-sectional view of this alternate embodiment.

Reference is now made to FIG. 5 which illustrates another assembly view of an alternate embodiment of the present invention. This embodiment includes a channel 30' and an air bag 50'. This channel 30' in comparison to channel 30 additionally includes outwardly extending flanges 120a and 120b attached to or formed as part of the tops of the sides 34a and 34b. With regard to the air bag 50' (shown shortened) the ends of the main panel 52 are looped generally at 122 and sewn together along a corresponding sewing seam or stitch line 124. In the embodiment shown in FIG. 5, the bar 64, end cap 44a and bracket 80 are of an integral construction, the purpose of which is to provide an improved method of securing the air bag to the channel. In this embodiment the bar, end cap and bracket are referred to generally as a connecting member 130. The connecting member is formed from a single stamping having a section 132 that will form an end piece. The section 134 includes opening 48. A portion of the stamping 132 is bent at 134 defining the first bar 64. Prior to being bent, an additional portion of the stamping extends outwardly from member 132. This extending part is thereafter bent at locations 136, 138, 140 and 142, defining the general shape as depicted in FIG. 5. As can be seen, the first bar 64 and a second 81 extend outwardly from the end piece 132. During assembly the looped ends 122 of the air bag are placed underneath the flanges 120 and adjacent to sides 34a and 34b (see FIG. 6). With the air bag in this position, the connecting member 130 and its extending arms 132 and 146 are slid within the corresponding loops 122. The spacing between arms 132 and 146 is sized to tightly clamp the air bag against the sides 34a and 34b. The free ends 150a and 150b of each arm are thereafter secured to another end member 152 that may additionally include an offset mounting flange portion 154. In this embodiment the soft outer shell 70 may be formed by two pieces of flexible material 170a and 170b sewn to the air bag 50'. Each piece of material 170a and 170b is connected to a rigid connecting member 172 having "J" or "U" shaped cross section. One of the pieces of material such as 120a includes the tear seam 78. After the air bag 50' is folded or rolled and the pieces of material 170 thereafter placed about the air bag and the connecting members 172 interfit or are otherwise joined together as shown in FIG. 6. The members 172 are preferably positioned at the side of the compacted air bag. The connecting members 172 will remain linked together by the outward force imparted to them by the air bag as it has a tendency to expand even when folded.

Figure 9:
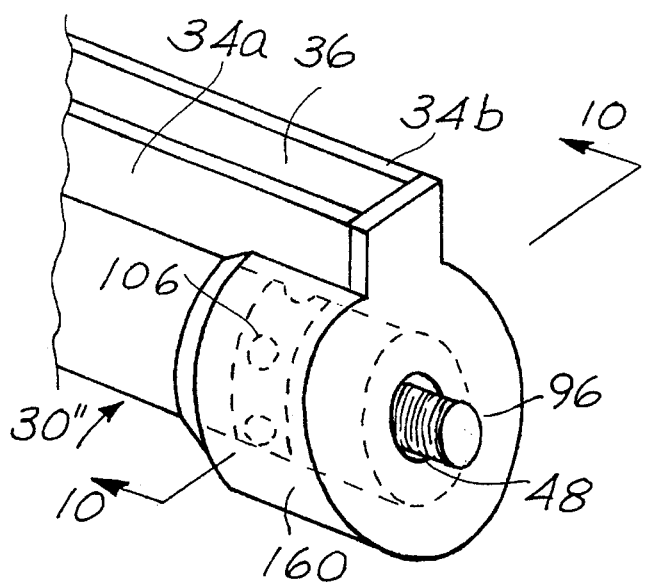
FIGS. 9 and 10 show an additional embodiment of the invention.
Figure 10:
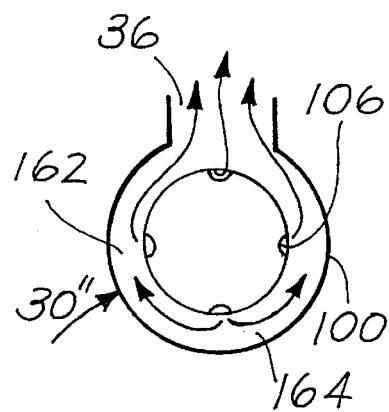

Reference is made to FIGS. 9 and 10. In this embodiment of the invention the channel 30" includes, at one end, an enlarged diameter portion 160 that defines a mixing chamber 162 about the distinct plurality of exit ports 106 that are typically found in a hybrid inflator. In the earlier embodiment of the invention, the inflation gas exiting exit ports 106 impact the closely spaced circular wall portion 32 of the channel 30 or 30'. Some of the inflation gas flows directly out through the channel open top 36 while a portion of the gas may tend to flow down the channel prior to flowing out through the open top 36. This axial flow lessens the inflator's efficiency due to the modest amount of heat energy that is lost or transferred from the inflation gas to the channel. The introduction of the mixing chamber 162 shown in FIGS. 9 and 10, channels or directs the gas, generally shown by arrow 164, outwardly through the open top 36 and directly into the air bag, lessening heat loss and maintaining the overall efficiency of operation. The concept of providing an inflator that has a high efficiency becomes more important when the quantity of propellant used is reduced (compared to inflators that inflator larger air bags), which is the case in the present invention, as the amount of stored gas and commensurate amount of propellant is relatively low, as can be seen from the dimensions of the inflator which are approximately 25 mm in diameter and 180 mm in length.

In operation an associated electronic control unit and sensing mechanism will generate a control signal, indicative of a side impact collision to cause the inflator to release and/or generate inflation gas, thereby inflating the air bag 50. As the air bag inflates it quickly opens its exterior, flexible shell 70 and emerges through a pre-defined slit or other purposefully weakened area in the seat such as at a seam between the side and front of the seat back or perforated section. Once inflated the air bag 50 will be positioned between the side of the occupant's torso and shoulder and an interior wall of the vehicle.

An advantage of the present invention stems from using a channel having a key hole shaped construction where the spacing between the side walls 34 is less than the major diameter of the circular portion 32 of the channel. In this way the bracketing 64, 80 and hardware utilized to secure the air bag to the channel does not extend beyond the major diameter of the channel thereby providing a relatively compact design as is apparent from the view shown in FIG. 4. In addition, as the present invention has been designed to be used and installed within a flexible seat, the resiliency afforded by the flexible shell and air bag makes its placement undetectable as it does not detract from the general softness or resiliency provided by the padded seat 16.

Many changes and modifications in the above described embodiment of the invention can, of course, be carried out without departing from the scope thereof. Accordingly, that scope is intended to be limited only by the scope of the appended claims.

We claim:

1. A side impact, occupant protection system comprising:

a housing (30) including an open side (36);

an inflator for providing inflation gas disposed within the housing such that the inflation gas flows through the open side of the housing;

an air bag (50) having a flexible, inflatable cushion (52, 54) portion which when inflated protects a seated occupant, prior to inflation of the cushion portion, the cushion portion is maintained in a compacted configuration outside and generally in front of the housing to provide a soft, cushioned boundary relative to the seated occupant, the cushion including a neck or inlet (56) portion adjacent the opening side of the housing to receive inflation gas exiting therefrom;

the compacted air bag cushion, prior to inflation thereof is maintained in its compacted configuration outside and generally in front of the housing by a soft, flexible shell (70) disposed thereabout, the shell including a preferred tear section opened on inflation of the air bag.

2. The device as defined in claim 1 including second means for mounting the channel within an upholstered portion of a seat.

3. The device as defined in claim 2 wherein the channel is mounted to a seat back.

4. The device as defined in claim 2 wherein the compacted air bag and shell abut the upholstered portion.

5. A side impact, occupant protection system comprising:

a channel (30) including an open portion (36);

an air bag (50) positioned about the channel in communication with the open portion and disposed in a pre-inflation compact, resilient configuration;

the air bag and channel covered solely by a soft, flexible shell (70) disposed about the compacted air bag, the shell including a preferred tear section opened on inflation of the air bag, wherein the channel (30) is key-hole in shape having a large and small diameter portion and wherein the system further includes an air bag inflator (90) for inflating the air bag positioned in the large diameter portion.

6. A side impact, occupant protection system comprising:

a channel (30) including an open portion (36);

an air bag (50) positioned about the channel in communication with the open portion and disposed in a pre-inflation compact, resilient configuration;

the air bag and channel covered solely by a soft, flexible shell (70) disposed about the compacted air bag, the shell including a preferred tear section opened on inflation of the air bag, wherein the channel includes a key-hole shaped cross-section including a first cylindrical wall portion (32) having a wide first diameter and a second portion (34a,b) having two spaced parallel sides, the spacing between the sides being less than that of the first diameter and wherein the spacing defines an open top (36) of the channel through which inflation gas may flow into an adjacent air bag (50), the channel additionally including a first end (36a) and a second end (36b), the first end substantially closed by a first end plate (44a) having a small opening (48) therein.

7. The device as defined in claim 6 including:

a cylindrically shaped air bag inflator fitted within the cylindrical portion of the channel having at least one gas exit port (106) thereon oriented to permit inflation gas to flow into the spacing, through the open top and thereafter into the air bag (50), the air bag is disposed, prior to activation of the inflator, in a compacted configuration over the top to enable inflation gas to enter therein; the air bag (50) is fitted about the sides of the channel such that opposing sections of the air bag lie adjacent to a corresponding side (34a,b) of the channel;

clamping means (64, 66, 80) running along substantially the entire length of each channel side for clamping a corresponding section of the air bag to the channel; wherein the clamping means, adjacent the air bag end sections, does not extend outwardly beyond the exterior of the cylindrical.

8. A side impact occupant protection system including:

an air bag module (10), having a soft exterior adapted to be placed in a seat member (14) of an automotive seat (16), the module; comprising:

a channel (30) having a key-hole shaped cross-section including a first cylindrical wall portion (32) having a wide first diameter and a second portion (34a,b) having two spaced parallel sides, the spacing between the sides being less than that of the first diameter and wherein the spacing defines an open top (36) of the channel through which inflation gas may flow into an adjacent air bag (50), the channel additionally including a first end (36a) and a second end (36b), the first end substantially closed by a first end plate (44a) having a small opening (48) therein;

a cylindrically shaped air bag inflator fitted within the cylindrical portion of the channel having at least one gas exit port (106) thereon oriented to permit inflation gas to flow into the spacing, through the open top and thereafter into the air bag (50), the air bag is disposed, prior to activation of the inflator, in a compacted configuration over the top to enable inflation gas to enter therein; the air bag (50) is fitted about the sides of the channel such that opposing sections of the air bag lie adjacent to a corresponding side (34a,b) of the channel;

clamping means (64, 66, 80) running along substantially the entire length of each channel side for clamping a corresponding section of the air bag to the channel; wherein the clamping means, adjacent the air bag end sections, does not extend outwardly beyond the exterior of the cylindrical portion; and air bag retaining means (70) disposed about the air bag for maintaining the air bag in its compacted configuration and for opening and releasing the air bag in response to inflation gas.

9. The device as defined in claim 8 including bracket means (80) for mounting the module (10) to the seat (16).

10. The device as defined in claim 8 wherein the air bag retaining means (70) comprises a flexible shell having two sets of opposition flexible wings (74a–d) and a tear line (78)

defining a preferred section about which the retaining means is torn open.

11. The device as defined in claim 8 wherein each channel side (34a,b) includes an outwardly extending flange (120), the distance between opposing sides of the extending flanges being less than the first diameter, wherein the air bag is mounted about each flange and a corresponding side and wherein the clamping means includes a pair of bars (64,81) securing the air bag to an underneath portion of each flange and to a corresponding side of the channel.

12. The device as defined in claim 11 wherein the pair of bars are joined at one side thereof to the first end piece (36).

13. The device as defined claim 10 wherein the bars, first end piece and a portion of the bracket are of integral construction.

14. A side impact occupant system including the combination of:

a vehicle seat (16) having a cushioned resilient portion (18) in a seat back (14) thereof, air bag module means (10) comprising a cylindrically shaped housing (30) including an open side (36);

an inflator for providing inflation gas disposed within the housing such that the inflation gas flows through the open side of the housing;

an air bag (50) having a flexible, inflatable cushion (52, 54) portion which when inflated protects a side of a seated occupant, prior to inflation of the cushion portion, the cushion portion is maintained in a compacted configuration outside and generally in front of the housing to provide a soft, cushioned boundary relative to the seated occupant, the cushion including a neck or inlet (56) portion adjacent the opening side of the housing to receive inflation gas exiting therefrom;

the compacted air bag cushion, prior to inflation thereof is maintained in its compacted configuration outside and generally in front of the housing by a soft, flexible shell (70) disposed thereabout, the shell including a preferred tear section opened on inflation of the air bag;

the compacted cushion, prior to inflation positioned directly adjacent to and behind the resilient cushioned portion of the seat, wherein the resiliency of the cushioned seat portion is not markedly changed by the adjacent positioning of the compacted air bag and resilient shell.

* * * * *